United States Patent [19]

Brown et al.

[11] 4,310,423

[45] Jan. 12, 1982

[54] STREAM WATER PUMPING MEANS AND METHOD

[76] Inventors: Steven F. Brown, R.R. #2, Clearwater, Kans. 67026; Harold F. Brown, 515 W. Shore, Wichita, Kans. 67209

[21] Appl. No.: 106,674

[22] Filed: Dec. 26, 1979

[51] Int. Cl.³ .................... B01D 29/38; B01D 35/02
[52] U.S. Cl. .................... 210/791; 210/242.1; 210/409; 210/416.1; 210/446; 210/460
[58] Field of Search ............ 210/170, 250, 409, 457, 210/460, 461, 472, 65, 242 R, 767, 791, 416.1

[56] References Cited

U.S. PATENT DOCUMENTS

| | | | |
|---|---|---|---|
| 1,591,923 | 7/1926 | Lebherz | 210/242 |
| 1,621,413 | 3/1927 | James | 210/242 |
| 1,852,867 | 4/1932 | White | 210/242 |
| 2,256,145 | 9/1941 | Hock | 210/472 |
| 2,335,096 | 11/1943 | Zech | 210/242 |
| 2,448,212 | 8/1948 | Dewey | 210/242 |
| 3,285,417 | 11/1966 | Schmidt | 210/409 |
| 3,547,553 | 12/1970 | Stanfield | 210/242 |

*Primary Examiner*—Robert H. Spitzer
*Attorney, Agent, or Firm*—John H. Widdowson

[57] ABSTRACT

A device and process for removing water from a river, pond, or the like. The device comprises a means for removing water through the device; a water intake chamber having a roof with a base periphery defining a water intake opening, and water exit aperture; a base plate; a hose exit means interconnecting the means for removing and the water exit aperture; a means for filtering the water being removed through the device; and an air chamber circumscribing the roof of said water intake chamber. The process comprises suspending by air means in the water the device; intaking water through the device; and filtering simultaneously to the intaking step the intaking water.

8 Claims, 6 Drawing Figures

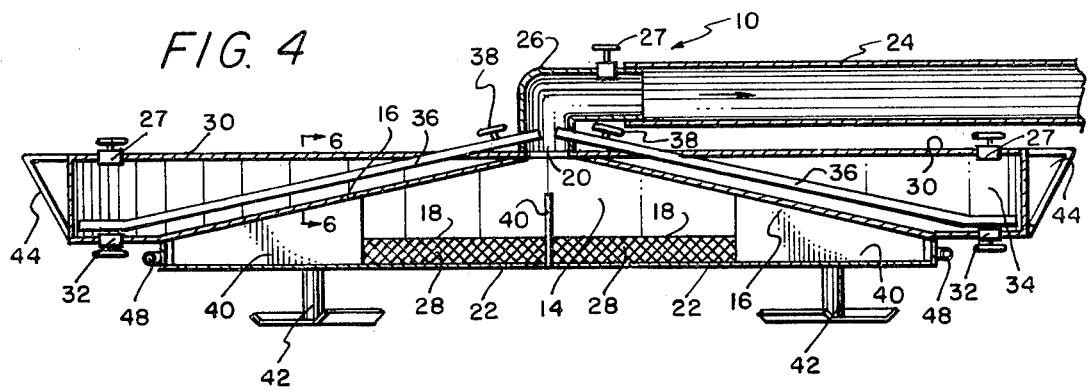
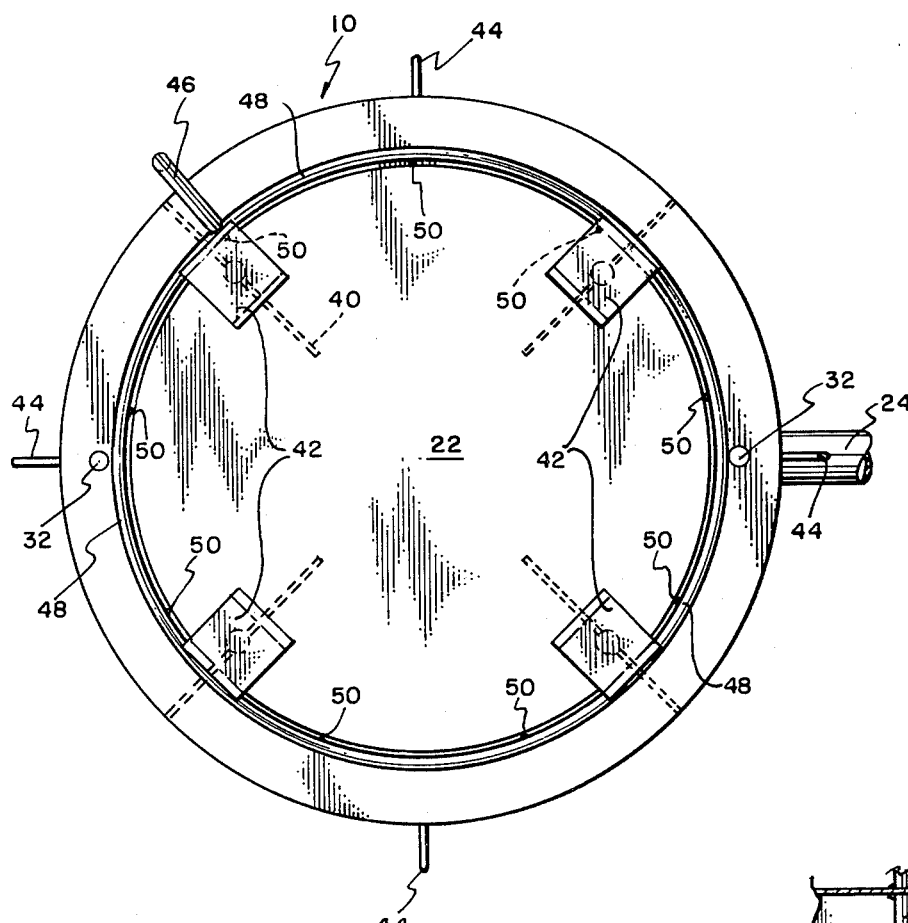

STREAM WATER PUMPING MEANS AND METHOD

BACKGROUND OF THE INVENTION

1. Field of the Invention

This invention provides a stream water pumping means and method. More particularly, this invention provides for a device and process for removing water from a river, pond, or the like, that has a sandy base and/or moving or floating debris such as leaves, sticks or weeds.

2. Description of the Prior Art

U.S. Pat. No. 3,495,714 by Barton teaches a strainer device. U.S. Pat. No. 705,364 by Kurtz discloses a strainer for mine-pumps. U.S. Pat. Nos. 616,364 and 3,037,636 by Shreeve and McFarlin, respectively, teach and disclose respectively a filtering device and a valve housing with a strainer. None of the foregoing prior art teach a device and method for removing water from a river, pond, or the like, that have a sandy base or floating debris, by controlling the turbulence in the water such as taught hereinafter.

SUMMARY OF THE INVENTION

This invention accomplishes its desired objects by providing a novel device and process for removing water from a river, pond, or the like, that has a sandy base and/or moving or floating debris such as leaves, sticks and weeds. The device comprises a means for removing water from the river or pond through the device; a water intake chamber having a roof with a base periphery defining a water intake opening and a water exit aperture; a base plate; and a hose exit means interconnecting the means for removing and the water exit aperture. The device also includes a means for filtering the water being removed through the device and an air chamber circumscribing the roof of the water intake chamber. The process includes the steps of suspending by air means in the river or pond in the device; intaking water through the water intake chamber; and filtering simultaneously to the intake step (b) the intaking water between the base plate and the roof of the water intake chamber.

It is an object of the invention to provide a novel device and process for removing water from a river, pond, or the like.

Still further objects of the invention reside in the provision of a device and process for removing water from a pond which can easily be stabilized through ballasting means, and is relatively inexpensive to manufacture.

These together with the various ancillary objects and features will become apparent as the following description proceeds, are attained by this stream water pumping means and method, a preferred embodiment being shown in the accompanying drawings, by way of example only, wherein:

BRIEF DESCRIPTION OF THE DRAWINGS

FIG. 4 is a vertical sectional view looking along the plane of line 4—4 in FIG. 4;
FIG. 5 is a bottom plan view of the invention;
and
FIG. 6 is a partial vertical sectional view taken along the plane of line 6—6 in FIG. 4.

DETAILED DESCRIPTION OF THE INVENTION

Figure 1:
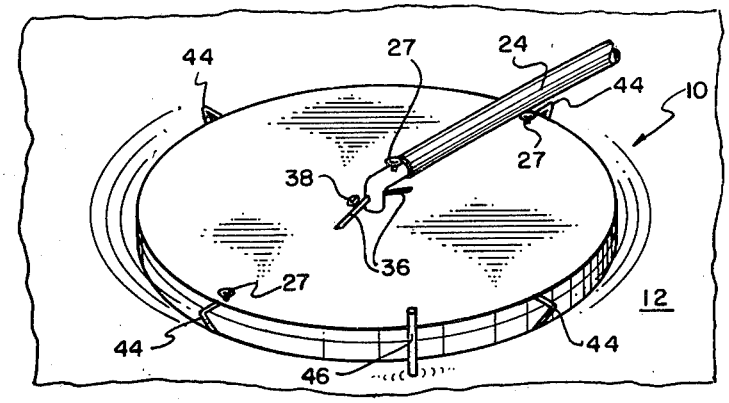
FIG. 1 is a perspective view of the invention.
Figure 2:
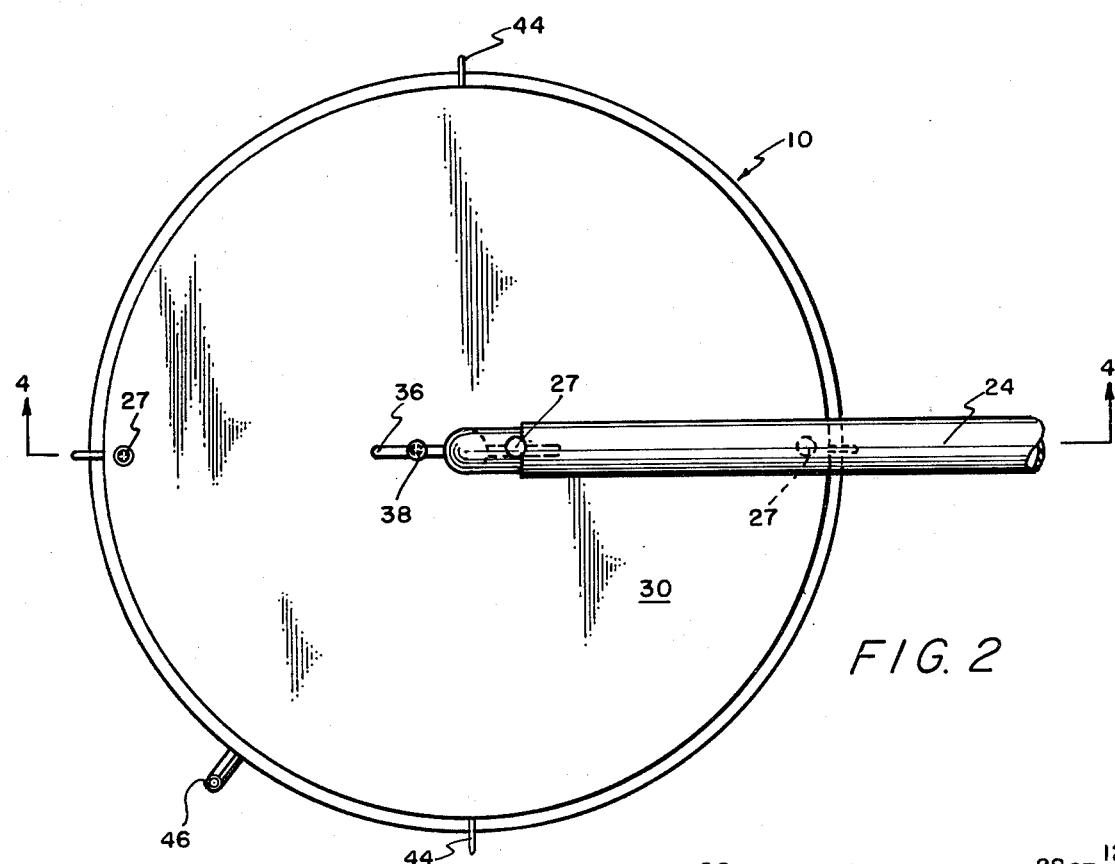
FIG. 2 is a top plan view of the invention.
Figure 3:
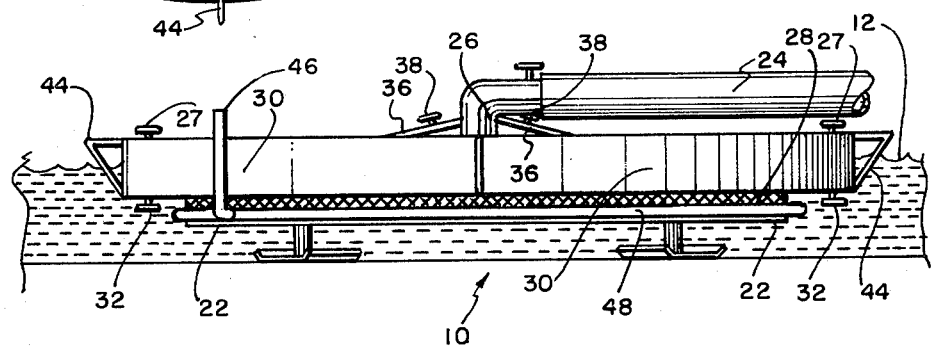
FIG. 3 is a side elevational view of the invention.

Referring in detail now to the drawings, wherein like reference numerals designate similar parts throughout the various views, there is seen an embodiment of the invention which is a device, generally illustrated as 10, for removing water 12 from a river, pond, or the like, that has a sandy base and/or moving or floating debris, comprising a pump (or similar) means (not shown in the drawings) located on the bank and for removing water 12 from the river, pond through the device 10, and a water intake chamber 14 (preferably conical shaped) having a roof 16 with a base periphery 18 defining a water intake opening, and a water exit aperture 20. The device 10 also includes an imperforate base plate 22 and a hose exit means 24 connecting to a flow exit conduit 26 (having air valve 27 and connecting to aperture 20) and to the pump means for removing located on the bank. A means for filtering 28 (preferably a wire screen, a gravel pack means, or the like) the water 12 being removed through the device 10 interconnects the base plate 22 and the base periphery 18 of the roof 16. An air chamber 30 having air valves 27 and drain plugs 32 circumscribes the roof 16 of the water intake chamber 14. Air chamber 30 also includes at least one air chamber separation web 34 connected on the inside thereof. Ballast siphoning tubes 36 having at least one siphoning valve 38 interconnects, straddles and lodges in between the air chamber 30 and the flow exit conduit 26. A plurality of base support webs 40 attach to the base plate 22 and to the roof 16 of the water intake chamber 14. A plurality of base support members 42 attach to the base plate 22, and at least one anchor lug 44 attaches to the device 10.

A cleaning water conduit 46 is attached to the device 10. A pressurized water supply means (e.g. the previously mentioned pump means for removing the water from the water) connects to the cleaning water conduit 46. A conduit filter cleaner 48 is contiguously disposed to the means for filtering 28 and attaches to the cleaning water conduit 46. A plurality of jet means 50 (e.g. nozzles) attaches to the conduit filter conduit 48 and operates to flush the means for filtering 28 free of debris.

With continuing reference to the drawings for operation of the invention, a suction through line 24 by a pump means located on the bank intakes water 12 through water intake chamber 14. Simultaneous to intaking, the water 12 is being filtered by filtering means 28 located between the plate 22 and the roof 16 of the water intake chamber 14. In an embodiment of the invention, the filtering means 28 can be cleaned by pressurized water coming from the water supply means, through the water conduit 46, the filter cleaner conduit 48, and the jet means 50, in order stated. In a preferred embodiment of the invention, the cleaning can be done simultaneously to the intaking and the filtering. The device 10 is suspended in the river or pond by the air chamber 30 being pressurized by air. The device 10 can be stabilized in the water 12 through ballasting by the passage of water through the ballast siphoning tube 36 being controlled by the siphoning valve 38. Drain plugs 32 are for draining the water, and air valves 27 relieve pressure so the water will run out through plugs 32 and the device 10 can be lifted by hand.

Changes may be made in the construction and arrangement of the parts or elements of the embodiment as disclosed herein without departing from the spirit or scope of the invention as defined in the following claims:

I claim:

1. A process for removing water from a river, pond, or the like, that has a sandy base and/or moving or floating debris such as leaves, sticks, weeds, by a device having a cone shaped water intake chamber with a water intake opening and a water exit aperture, a base plate, a filtering means interconnecting the base plate the the base periphery of the roof of the water intake chamber, an air chamber circumscribing the roof of the water intake chamber, a cleaning water conduit attached to the device, a conduit filter cleaner contiguously disposed to filtering means and attached to the cleaning water conduit, jet means attached to the conduit filter cleaner, at least one ballast siphoning tube having a siphoning valve interconnecting the air chamber with a flow exit conduit that is secured to and around the water exit aperture, said air chamber includes at least one air chamber separation web connected on the inside thereof, at least one drain plug, and at least one air valve, said device having a flow exit conduit having an exit air valve, and positioned between and interconnecting said exit aperture and said hose exit means, the process comprises the steps of:
   (a) pressuring the air chamber with a pneumatic matter to suspend the device in the river or pond;
   (b) intaking water through the water intake chamber;
   (c) filtering simultaneously to said intaking step (b) said intaking water between said imperforate plate and said roof of said water intake chamber; and
   (d) stabilizing said device by ballasting the air chamber through the ballast siphoning tube.

2. The process of claim 1 additionally including cleaning said filtering means by injecting a pressurized water supply through the cleaning water conduit into the conduit filter cleaner and through the jet means for flushing the filtering means free of debris.

3. The process of claim 2 wherein said cleaning step is simultaneous to the filtering.

4. A device for removing water from a river, pond, or the like, that has a sandy base and/or moving or floating debris such as leaves, sticks, weeds comprising:
   (a) a means for removing water from the river, pond, or the like, through the device;
   (b) a water intake chamber having a roof with a base periphery defining a water intake opening, and a water exit aperture;
   (c) a base plate;
   (d) a hose exit means interconnecting the means for removing and the water exit aperture;
   (e) a means for filtering the water being removed through the device, said means for filtering interconnecting the base plate and the base periphery of the roof;
   (f) an air chamber circumscribing the roof of said water intake chamber; and
   (g) a cleaning water conduit attached to said device, a pressurized water supply means connected to said water conduit, a conduit filter cleaner contiguously disposed to said means for filtering and attached to said cleaning water conduit, and a plurality of jet means attached to said conduit filter cleaner for flushing said means for filtering free of said debris; said water intake chamber defines a cone; said air chamber includes at least one air chamber separation web connected on the inside thereof, at least one drain plug, and at least one air valve, and said device comprises a flow exit conduit having an exit air valve, and positioned between and interconnecting said exit aperture and said hose exit means.

5. The device of claim 4 additionally including at least one ballast siphoning tube interconnecting said air chamber with said flow exit conduit, said siphoning tube having at least one siphoning valve.

6. The device of claim 5 additionally comprising a plurality of base support webs attaching to said base plate and to said roof of said water intake chamber.

7. The device of claim 6 additionally comprising a plurality of base support members attached to said base plate.

8. The device of claim 7 additionally including at least one anchor lug attached thereto.

* * * * *